E. SNIDER.
WHEEL FOR TRACTORS.
APPLICATION FILED MAR. 7, 1919.
1,336,791.
Patented Apr. 13, 1920.
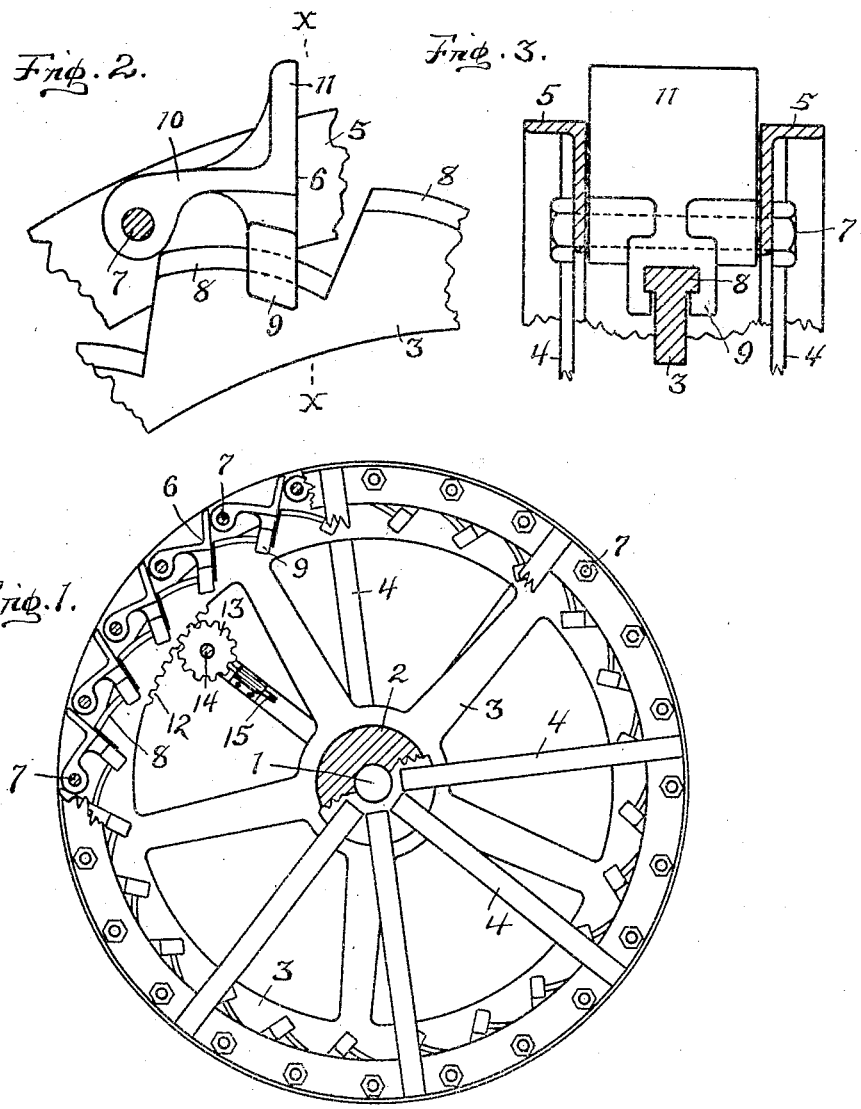

UNITED STATES PATENT OFFICE.

ELLSWORTH SNIDER, OF MONROEVILLE, INDIANA.

WHEEL FOR TRACTORS.

1,336,791. Specification of Letters Patent. Patented Apr. 13, 1920.

Application filed March 7, 1919. Serial No. 281,209.

*To all whom it may concern:*

Be it known that I, ELLSWORTH SNIDER, a citizen of the United States of America, and resident of Monroeville, in the county of Allen and State of Indiana, have invented certain new and useful Improvements in Wheels for Tractors, of which the following is a specification.

This invention relates to improvements in wheels for tractors, trucks and similar vehicles, and the object thereof is to provide a drive-wheel capable of rolling smoothly upon hard road surfaces, and provided with numerous adjustable blades that may be readily projected so as to protrude beyond the outer faces of the bearing rims when traveling over soft earth. The intention is to utilize the blades when mud or soft earth is encountered, in order to secure greater tractive hold upon the loose material in passing over it, and to withdraw the blades when the smooth treads of the rims are sufficient for tractive purposes as when traveling over a road having a hard surface.

The usual ground wheels have cleats of various designs permanently secured to the outer face of the wheel, and these prove injurious to the surface of the roads, especially when the load carried by the wheels is heavy, and the present invention is intended to obviate this objection and to secure an effective hold upon the ground when great tractive force is required in propelling the vehicle.

The object of the improvement is accomplished by the construction illustrated in the accompanying drawings in which:—

Figure 1 is a side elevation of a wheel embodying the invention, there being parts cut away and in section;

Fig. 2 is a detail view upon an enlarged scale showing one of the adjustable dogs in a partially extended position; and Fig. 3 is a transverse section on the line *x—x* of Fig. 2.

Similar characters of reference indicate corresponding parts throughout the several views and having reference now to the same:

1 is an axle having a hub 2 upon which is loosely mounted a cam-wheel 3 and to which are rigidly fixed opposite sets of spokes 4, one set for each side of the wheel. The tread of the wheel is formed of a pair of rims 5, made of angle iron, oppositely positioned and secured to the outer ends of the corresponding set of spokes 4. The rims are spaced apart and an annular series of dogs 6 are mounted between the rims on transverse bolts 7 respectively that extend through the rims. The cam-wheel 3 has at its outer periphery a series of involute cams 8 that project laterally upon each side and extend loosely in the slotted jaws 9 of the dogs correspondingly. Each dog has an extending arm 10 through which the bolt 7 extends, and also an outwardly extending blade 11 that is adapted to become projected outwardly beyond the tread formed by the rims, or drawn within the outer perimeter of the rims accordingly as the cam-wheel is adjustably shifted.

As a means of shifting the cam-wheel, a segmental rack 12 is formed in the wheel and a pinion 13 is mounted upon a shaft 14 which extends through the opposite spokes 4 of the wheel proper. Also, a sliding bolt 15 is fixed upon one of the spokes and arranged so as to be projected between the teeth of the pinion and lock it from turning. The pinion engages the rack 12 so as to move the cam-wheel when the shaft 14 is turned.

In the operation of the invention, the dogs are swung outwardly or drawn inwardly, by adjustably turning the cam-wheel by means of the shaft and pinion, according to the condition of the ground encountered. When the dogs are adjusted to their innermost position the wheel rolls upon its two rims contacting with the ground. This adjustment is suitable when traveling over hard surfaces. However, when the ground is loose or too soft to support the rims upon its surface, the dogs are projected outwardly by turning the cam-wheel and are held in that position by applying the bolt to the pinion by which the cam-wheel is turned. When thus positioned the projecting blades of the dogs sink into the loose or soft earth, and the outer faces of the arms 10 of the dogs as well as the treads of the rims bear upon the earth and afford an increased area of bearing surface for supporting the wheel upon the ground.

What I claim is:—

1. In a tractor wheel, a pair of rims formed of angle iron and positioned oppositely so as to present outwardly projecting flanges to form the fixed tread of the wheel; a hub; two sets of spokes in connection respectively with the ends of the hub and the corresponding rims; an adjustably movable wheel concentrically mounted on the hub between the pairs of spokes and having at its outer perimeter an annular series of cams; an annular series of dogs, each having at one end thereof pivotal support between the rims and at its opposite end an outwardly projecting blade and an inwardly extending pair of slotted lugs that have engagement with one of the cams on the adjustable wheel, those portions of the dogs between their pivoted ends and their blades being adapted to be maintained uniformly in position flush with the fixed tread of the wheel when the dogs are adjusted to their outer positions; and means for adjusting the cam-wheel and for securing it in adjusted positions.

2. In a tractor wheel, a pair of rims, spaced apart, having oppositely projecting flanges that form the fixed tread of the wheel; a central hub having spokes at each end thereof securing the respective rims; an annular series of dogs positioned between the rims, each dog having an arm pivoted at one end thereof between the rims and having at its opposite end an outwardly projecting blade; and means supported in the wheel and connected with each dog adapted to adjustably move the dogs uniformly and secure them in position, said dogs being so formed and supported that their respective arms may be maintained in position flush with the fixed tread of the wheel.

In testimony whereof I affix my signature in presence of two witnesses.

ELLSWORTH SNIDER.

Witnesses:
  MATILDA METTLER,
  W. G. BURNS.